(12) United States Patent
Ryan

(10) Patent No.: US 9,625,245 B2
(45) Date of Patent: Apr. 18, 2017

(54) TAPE MEASURE ANCHOR

(71) Applicant: Henry S. Ryan, Chugiak, AK (US)

(72) Inventor: Henry S. Ryan, Chugiak, AK (US)

(*) Notice: Subject to any disclaimer, the term of this patent is extended or adjusted under 35 U.S.C. 154(b) by 92 days.

(21) Appl. No.: 14/676,885

(22) Filed: Apr. 2, 2015

(65) Prior Publication Data
US 2015/0345923 A1    Dec. 3, 2015

Related U.S. Application Data

(60) Provisional application No. 62/003,782, filed on May 28, 2014.

(51) Int. Cl.
*G01B 3/10* (2006.01)

(52) U.S. Cl.
CPC .... *G01B 3/1071* (2013.01); *G01B 2003/1076* (2013.01)

(58) Field of Classification Search
CPC ........................................................ G01B 3/10
USPC ........................................................... 33/755
See application file for complete search history.

(56) References Cited

U.S. PATENT DOCUMENTS

| | | | | |
|---|---|---|---|---|
| 4,572,008 A * | 2/1986 | Nielson | ............... | G01N 1/08 73/864.51 |
| 4,771,272 A * | 9/1988 | Barnes | ............... | G01F 23/74 200/84 C |
| 4,976,041 A * | 12/1990 | Oshiro | ............... | B44D 3/38 33/392 |
| 5,079,848 A * | 1/1992 | Oshiro | ............... | B44D 3/38 33/392 |
| 5,232,536 A * | 8/1993 | Oshiro | ............... | B44D 3/38 156/295 |
| 5,406,838 A | 4/1995 | Miller | | |
| 5,481,813 A * | 1/1996 | Templeton | ............... | G01B 3/1071 33/758 |
| 6,295,739 B1 | 10/2001 | Kraft | | |
| 6,427,358 B1 * | 8/2002 | LeBon | ............... | G01B 3/1071 33/755 |
| 6,578,274 B1 * | 6/2003 | Tango, Jr. | ............... | E04G 21/1825 33/1 G |
| 6,839,981 B2 | 1/2005 | Rafter | | |
| 7,240,439 B2 | 7/2007 | Critelli | | |
| 7,487,600 B1 * | 2/2009 | Cooper | ............... | G01B 3/1056 33/770 |
| 2015/0345923 A1 * | 12/2015 | Ryan | ............... | G01B 3/1071 33/758 |

* cited by examiner

*Primary Examiner* — Yaritza Guadalupe-McCall
(74) *Attorney, Agent, or Firm* — Global Intellectual Property Agency, LLC; Daniel Boudwin

(57) ABSTRACT

Provided is a weighted anchor for a tape measure. The device includes a tubular housing with a defined interior volume for holding one or more magnetic weights therein. The weights are positioned around an elevator bolt disposed within the interior volume, then secured within the interior volume via a washer and a bolt. In this way, the weights are arranged in a stacked orientation. The housing can be secured to an end of a standard tape measure, thereby weighing down the same. In this way, the present invention can prevent the tape measure from swinging or otherwise oscillating when measuring long distances.

9 Claims, 3 Drawing Sheets

TAPE MEASURE ANCHOR

CROSS REFERENCE TO RELATED APPLICATION

This application claims the benefit of U.S. Provisional Application No. 62/003,782 filed on May 28, 2014. The above identified patent application is herein incorporated by reference in its entirety to provide continuity of disclosure.

BACKGROUND OF THE INVENTION

Field of the Invention

The present invention relates to an attachment for tape measures. More specifically, the present invention pertains to an improved weighted anchor for tape measures. In one embodiment, the present invention comprises a housing with one or more magnetic weights enclosed therein. The magnetic weights are removable, so that the present invention is readily adjustable in weight.

A tape measure is a common measuring tool comprising a flexible ruler. Its design allows for a measure of great length to be easily carried in pocket or toolbox and permits individuals to measure around curves and corners. Due to its flexible nature, however, tape measures can be frustrating to use when measuring long distances. Particularly, a tape measure can swing or bend when the free end of the tape measure is not probably anchored. Other factors, such as wind, can cause the end of the tape measure to not stay in place.

When the tape measure is not properly anchored, it can result in inaccurate measurements, which can be problematic. This can be especially true for construction work or building projects. Accordingly, many individuals receive assistance from others to hold the free end in place when measuring long distances. It can be impracticable and inconvenient to seek assistance from others, however, as many individuals work independently. Accordingly, a device that allows individuals to temporarily anchor an end of a tape measure when measuring long distances is desired.

The present invention provides a tape measure anchor that can be removably attached to various types of tape measures. The present invention comprises a tubular housing for holding one or more weights therein. The housing is elongated in shape so that the weights are preferably arranged in a stacked orientation in the interior volume of the housing. The weights are held in place via an elevator bolt that extends vertically from the lower end of the housing. Preferably, the elevator bolt extends beyond the upper end of the housing. The upper end of the housing is open to provide access to the interior volume of the housing. The upper end comprises a cover removably attached thereto. The cover is secured via a nut, which is screwed onto the elevator bolt.

The primary advantage of the present invention is not only that it is adapted for use with a number of different tape measures, but more specifically the weights, which are composed of a magnetic material. In this way, the weights are magnetically coupled to each other and to the elevator bolt. This prevents the weights from shifting or moving extensively during use, providing additional stability to the end of the tape measure.

Description of the Prior Art

Devices have been disclosed in the prior art that relate to attachments for tape measures. These include devices that have been patented and published in patent application publications. Some of these devices disclose a holder that attaches to an end of a tape measure for stabilizing the tape measure when measuring an area on the floor. Other devices disclose an adhesive pad that attaches to an end of a tape measure for making measurements. These devices, however, do not disclose a weight anchor for a tape measure comprising a body in which one or more magnetic weights can be positioned, such that the weight of the anchor is adjustable. The foregoing is a list of devices deemed most relevant to the present disclosure, which are herein described for the purposes of highlighting and differentiating the unique aspects of the present invention, and further highlighting the drawbacks existing in the prior art.

Specifically, U.S. Pat. No. 6,295,739 to Kraft discloses a measuring tape holding device that comprises a rectangular holder body having a slot thereon. The slot is adapted to receive a tape end tab. Thereafter, the holder body and the tape end tab can be nailed to a surface such as the floor so that the holder body and the tape end tab are fixed in place. In contrast, the present invention comprises a tape measure anchor that can be removably attached to a tape end tab. The tape measure anchor adds weight to the tape measure so as to prevent it from moving easily. The present invention, however, does not fix the tape end tab to the floor.

Similarly, U.S. Pat. No. 6,427,358 to LeBon discloses an anchor for measuring tape, comprising a circular base having a protruding housing mounted thereon. The housing includes channel that spans opposing edges thereof. The channel is adapted to receive a tape measure pull tab therein. The base can be secured to a surface via adhesives. Accordingly, LeBon does not disclose an anchor having removable weights therein. The present invention discloses a housing having a plurality of removable weights therein. In this way, the user can adjust the amount of weight to attach to the end of a tape measure.

U.S. Pat. No. 6,839,981 to Rafter and U.S. Pat. No. 7,240,439 to Critelli et al. disclose supplemental pull tabs for tape measures. These devices generally comprise a first section that is substantially perpendicular to a second section, so as to form a general L-shape when viewed from the side. The first and second sections comprise an indentation for receiving a tape end tab therein. Alternatively, fasteners such as screws can be used to attach the device to the tape end tab. The supplemental pull tabs can be used to provide additional means to engage a work piece at an end thereof. The foregoing devices, however, do not disclose a weight or an anchor for tape measures.

Finally, U.S. Pat. No. 5,406,838 to Miller discloses a magnetic anchor that can be removably attached to fluid level measuring devices. The device comprises a cylindrical weight having a vertical member extending from a top portion thereof. The vertical member is slideably attached to a U-shaped member that is configured to engage a fluid level measuring device. Miller, however, does not include a housing for securing weights therein.

The devices disclosed in the prior art have several known drawbacks. These devices do not disclose an anchor that may be readily adjusted in weight so that it is adaptable for various uses. The present invention overcomes these limitations by disclosing an anchor having a hollow, tubular housing. The interior of the housing is configured to removably receive a plurality of weights therein, preferably in a stacked orientation. Additionally, the housing can be mounted to an end of a tape measure at a tape end tab. In this way, the present invention can be used with a number of different tape measures.

It is therefore submitted that the present invention is substantially divergent in design elements from the prior art, and consequently it is clear that there is a need in the art for an improvement to tape measure anchors. In this regard, the instant invention substantially fulfills these needs.

SUMMARY OF THE INVENTION

In view of the foregoing disadvantages inherent in the known types of attachments for tape measures now present in the prior art, the present invention provides a new and improved tape measure anchor wherein the same can be utilized for maintaining an end of a tape measure in place and preventing the tape measure from swinging or otherwise moving out of place.

It is therefore an object of the invention to provide a new and improved tape measure anchor that has all of the advantages of the prior art and none of the disadvantages.

Another object of the present invention is to provide a new and improved tape measure anchor that may be readily adjusted in weight.

Yet another object of the present invention is to provide a new and improved tape measure anchor that may be removably attached to any of various types and styles of tape measures.

Still yet another object of the present invention is to provide a new and improved tape measure anchor that is compact in size so as to prevent interfering with the usage of a tape measure on which it is installed.

Still yet another object of the present invention is to provide a new and improved tape measure anchor wherein the device may be readily fabricated from materials that permit relative economy and are commensurate with durability.

Other objects, features, and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein the numeral annotations are provided throughout.

DETAILED DESCRIPTION OF THE INVENTION

Figure 1:
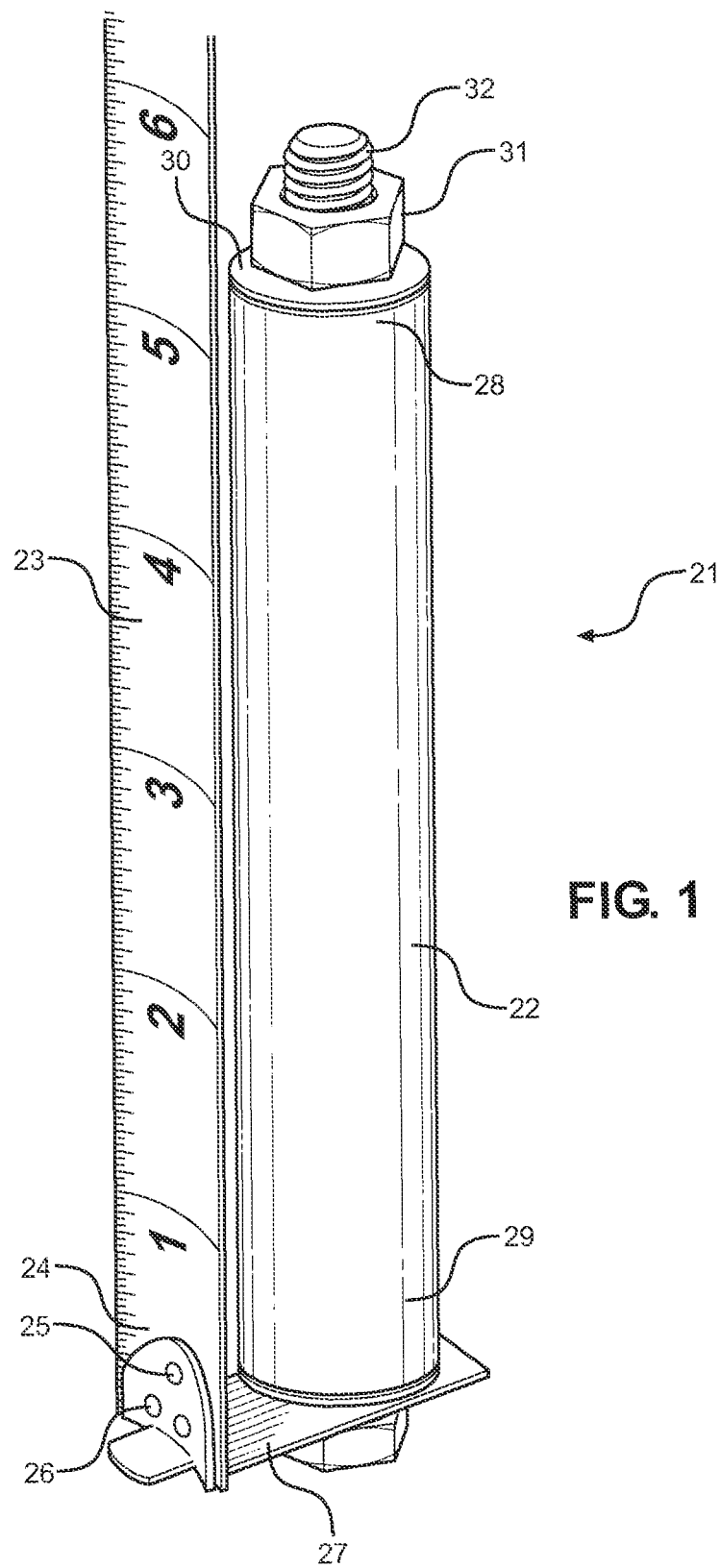
FIG. 1 shows a perspective view of the present invention as installed on a tape measure.

References are made herein to the attached drawings. Like reference numerals are used throughout the drawings to depict like or similar elements of the tape measure anchor. For the purposes of presenting a brief and clear description of the present invention, the preferred embodiment will be discussed as used to maintain an end of a tape measure in place and prevent the tape measure from swinging. The figures are intended for representative purposes only and should not be considered to be limiting in any respect.

Referring now to FIG. 1, there is shown a perspective view of the present invention as installed on a tape measure 23. The tape measure anchor 21 of the present invention comprises a substantially tubular housing 22 having an open upper end 28 and a closed lower end 29. The housing 22 comprises a defined interior volume for storing one or more weights therein. The lower end 29 comprises an elevator bolt 32 that extends vertically upward therefrom and towards the upper end 28, wherein the elevator bolt 32 is disposed within the interior volume of the housing 22. Additionally, the elevator bolt 32 is centrally located within the interior volume of the housing 22.

The upper end 28 of the housing 22 comprises a lid 30 removably attached thereto. The lid 30 comprises a centrally located aperture thereon, so as to receive the elevator bolt 32 therethrough. In this way, the elevator bolt 32 extends beyond the upper end 28 of the housing 22. The lid 30 is secured to the upper end 28 of the housing via a nut 31 that can be screwed onto the elevator bolt 32. Accordingly, the elevator bolt 32 comprises threaded elements over the length thereof.

The housing 22 can be secured to a tape end tab 25 of the tape measure 23. The tape end tab 25 is disposed at a free end 24 of the tape measure 23. The tape end tab 25 includes a first section 26 that is substantially perpendicular to a second section 27. The lower end 29 of the housing 22 is removably attached to the second section 27 of the tape end tab 25. In one embodiment, it is contemplated that the second section 27 of the tape end tab 25 comprises an aperture through which the elevator bolt 32 can be inserted in order to secure the housing 22 to the tape end tab 25.

Figure 2:
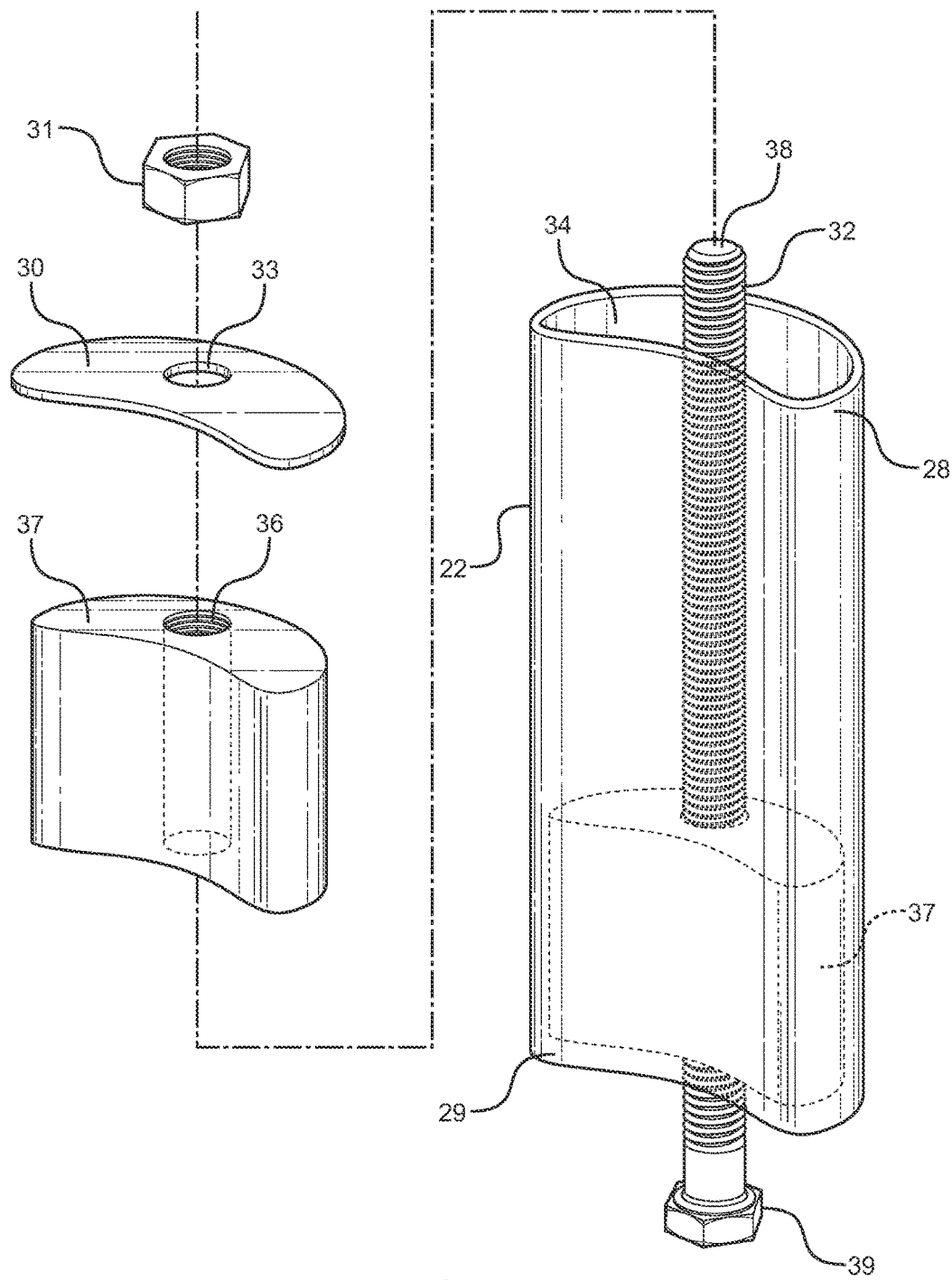
FIG. 2 shows a disassembled view of the present invention.

Referring now to FIG. 2, there is shown a disassembled view of an embodiment of the present invention. Without limitation, the tubular housing 22 may comprise a circular cross section, an oval cross section, or a semi-circular cross section, or the like so that the housing can rest flush against the surface of the tape measure, which generally comprises printed units of measurement on a concave side thereof. The elevator bolt 32 is inserted through the aperture disposed on the lower end 29 of the housing 22 so that the head 39 of the elevator bolt 32 is at the lower end 29 of the housing 22 and the distal end 38 of the elevator bolt 32 is at the upper end 28 of the housing 22. Preferably, the aperture is centrally located on the lower end 29. When the housing 22 is removably attached to a tape end tab 25, the elevator bolt 32 may be inserted through the tape end tab 25 and then through the lower end 29 of the housing 22.

The bolt 32 extends through the interior volume 34 of the housing 22 and extends beyond the upper end 28 of the housing 22. One or more magnetic weights 37 can be inserted through the open upper end 28 of the housing 22. Each of the weights 37 comprises a tubular shape. The weights 37 are shaped similarly to the housing 22 so that they can fit snugly within the interior volume of the housing 22. The weights 37 comprise an aperture 36 that extend from an upper surface to a lower surface thereof. The aperture 36 is dimensioned so that the distal end 38 of the elevator bolt 32 can be threaded therethrough when the weights 37 are inserted from the open upper end 28 of the housing 22. The elevator bolt 32 prevents the weights 37 from shifting or moving extensively during use by maintaining the weights 37 in a stacked orientation within the interior volume 34 of the housing. Furthermore, weights 37 are magnetic so that the weights 37 are magnetically coupled to each other and to the bolt 32. The weights 37 may be entirely composed of a magnetic material and preferably ferromagnetic material, or comprise a magnetic shell with a dense core.

The upper end 28 of the housing 22 comprises a cover 30 removably attached thereto. The cover 30 comprises a shape that is substantially similar to the cross section of the housing 22. The cover 30 comprises an aperture 33 centrally located thereon, so as the distal end 38 of the elevator bolt 32 can be threaded therethrough. The cover 30 is adapted to rest flush against the upper end 28 of the housing 22 so as to block access to the interior volume 34 thereof. Thereafter, a fastener such as a nut 31 can be screwed onto the elevator bolt 32 to secure the cover 30 in place.

Figure 3:
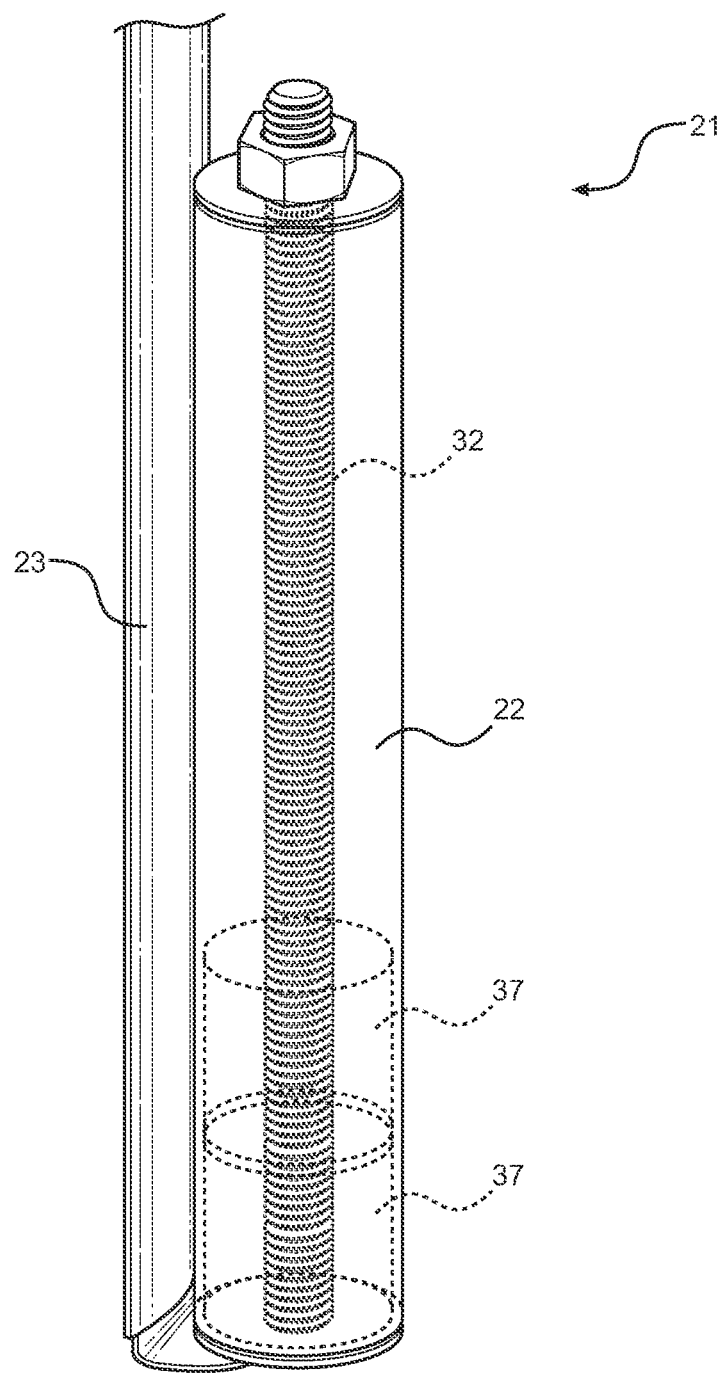
FIG. 3 shows a transparent view of the present invention as installed on a tape measure.

Referring now to FIG. 3, there is shown a transparent view of the present invention as installed on a tape measure. Preferably, the tape measure anchor 21 is installed so that the housing 22 rests flush against the concave side of the tape measure 23. The housing 22 is configured to store a plurality of magnetic weights 37 therein. The weights 37 are disposed around the elevator bolt 32 in a stacked orientation. It is contemplated that the upper portion and the lower portion of the weights 37 comprise opposite poles. In this way, the upper surface of one weight 37 can be adjacent to the lower surface of another weight 37.

Each of the weights 37 are substantially equal in dimension and weight. The user can add as many weights 37 as necessary or as desired for use. Generally, the user may add more weights 37 when measuring longer distances, and remove weights 37 when measuring shorter distances. By adding weight to the free end of the tape measure, the present invention prevents the tape measure from drifting due to wind. This is particularly useful when the user is measuring long distances by himself or herself, and needs to temporarily secure the end of the tape measure in place.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above descriptions then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specifications are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tape measure anchor, comprising:
   a tubular housing including an open upper end and a closed lower end;
   a threaded elevator bolt removably mountable into an interior volume of the tubular housing, the elevator bolt including a length larger than a length of the tubular housing;
   the open upper end including a removable lid for providing access to the interior volume of the tubular housing, the lid including an aperture at a center thereof for receiving the elevator bolt therethrough;
   the closed lower end including an aperture at a center thereof for receiving the elevator bolt therethrough;
   one or more weights removably insertable into the interior volume of the housing, each of the one or more weights including a diameter smaller than a diameter of the tubular housing;
   wherein the one or more weights are removably securable around the elevator bolt, each of the one or more weights including a threaded aperture extending along a longitudinal length thereof configured to threadably engage the elevator bolt;
   a fastener including a threaded engagement, the fastener configured to threadably engage an end of the elevator bolt.

2. The tape measure anchor of claim 1, wherein the one or more weights are magnetic and configured to magnetically couple to one another.

3. The tape measure anchor of claim 2, wherein the one or more weights are magnetically couplable to one another in a stacked and linear arrangement.

4. The tape measure anchor of claim 1, wherein the elevator bolt extends beyond the open upper end of the tubular housing.

5. The tape measure anchor of claim 1, wherein said housing is substantially cylindrical.

6. The tape measure anchor of claim 1, wherein said housing comprises a round cross section.

7. The tape measure anchor of claim 1, wherein said housing is removably securable to a tape measure having an end tab, wherein said elevator bolt is adapted to be threaded through said end tab.

8. The tape measure anchor of claim 1, wherein the elevator bolt extends along a longitudinal and center axis of the interior volume of the tubular housing.

9. The tape measure anchor of claim 1, wherein the fastener comprises a threaded nut configured to threadably engage an end of the elevator bolt and secure the lid over the open upper end.

* * * * *